United States Patent [19]

Hearn et al.

[11] 3,916,316

[45] Oct. 28, 1975

[54] MULTICHANNEL LOGARITHMIC RF LEVEL DETECTOR

[75] Inventors: Chase P. Hearn, Williamsburg; Curtis L. Shriver, Grafton, both of Va.

[73] Assignee: The United States of America as represented by the National Aeronautics and Space Administration Office of General Counsel-Code GP, Washington, D.C.

[22] Filed: Mar. 20, 1974

[21] Appl. No.: 453,115

[52] U.S. Cl. ................ 325/304; 325/306; 325/372; 328/145; 343/176

[51] Int. Cl.[2] ........................................ H04B 1/10

[58] Field of Search ........... 325/301, 304, 305, 306, 325/349, 372, 374, 376, 366, 367, 56, 485, 3, 371; 343/176, 205; 328/142, 145, 60, 62, 63; 329/146, 147

[56] References Cited

UNITED STATES PATENTS

| | | | |
|---|---|---|---|
| 2,572,912 | 10/1951 | Bucher | 325/304 |
| 2,968,718 | 1/1961 | McKesson | 325/304 |
| 3,302,115 | 1/1967 | Shiki | 325/304 |
| 3,305,781 | 2/1967 | Robinson | 325/305 |
| 3,365,666 | 1/1968 | Reynders et al. | 325/304 |
| 3,729,681 | 4/1973 | Elder | 325/304 |

*Primary Examiner*—Robert L. Griffin
*Assistant Examiner*—Jin E. Ng
*Attorney, Agent, or Firm*—Howard J. Osborn; William H. King; John R. Manning

[57] ABSTRACT

The invention is a logarithmic RF level detector which can be used to derive gain-weighting signals in an n-channel angle modulation diversity receiving system. The IF signals in the *n*-channel receiving system are sequentially gated into a single logarithmic IF amplifier which compresses the input signal dynamic range by a factor on the order of a hundred to one. The amplifier output signal is envelope detected and then gated back into the *n*-channels essentially simultaneously with the gating of the signals into the logarithmic amplifier. After being gated back into its channel each signal feeds a low-pass filter which passes only the low-pass, or zeroth order zone. The signals so derived may then be used to actuate a diversity combination operation.

3 Claims, 4 Drawing Figures

MULTICHANNEL LOGARITHMIC RF LEVEL DETECTOR

ORIGIN OF THE INVENTION

The invention described herein was made by employees of the United States Government and may be manufactured and used by or for the Government for governmental purposes without the payment of any royalties thereon or therefor.

BACKGOUND OF THE INVENTION

The invention relates generally to diversity receiving systems and more specifically concerns a multichannel logarithmic RF level detector for use in angle modulation diversity receiving systems. In addition, this invention is applicable to any situation in which it is desired to measure the amplitudes of a number of RF signals with low differential error.

In any diversity receiving system there is a nonlinear transformation of the signal in each of the channels with a device such as a logarithmic amplifier and then the signal level of each channel is measured. With this information, the channels may be combined in some manner (switching, equal gain or maximal ratio) to provide, on a long-term basis, a better signal than any single channel alone could have provided.

A commonly encountered method of implementing a diversity system is to use separate receivers for each channel and derive the signal level information from the automatic gain control (AGC) voltage line in each receiver. Thus, the signal level in each channel is measured independently of all other channels. The disadvantages associated with this approach are the AGC time constant varies with the signal level, the channels are subject to differential offsets leading to incorrect channel selection in a switching diversity system, and the intercept and slope matching of the AGC voltage versus signal levels becomes difficult when the number of channels is greater than two.

It is therefore the primary purpose of this invention to provide a multichannel RF level detector which either eliminates or minimizes the above-mentioned problems.

SUMMARY OF THE INVENTION

Each channel in the diversity receiving system up to the demodulation, consists of preselection, downconversion, gain, and the final intermediate (IF) filtering. Then the IF signal is split into a hybrid by a power divider with part being routed to a demodulator and the other part being routed to a signal detector that is the heart of this invention. All IF signals routed to the signal level detector are sequentially gated into a single logarithmic IF amplifier which compresses the input signal dynamic range by a factor on the order of a hundred to one. The amplifier output signal is envelope detected and then gated back into the n-channels essentially simultaneously with the gating of the signals into the logarithmic amplifier. After being gated back into its channel each signal feeds a low-pass filter which passes only the the low-pass, or zeroth order, zone. The resulting signal in each channel is the logarithm of the input signal envelope in that channel. For post-detection switching diversity, the signals from all channels are then compared and the video from the channel having the largest signal is selected.

A significant aspect of the gating operations in the signal level detector is the fact that the pulses gating the signals out of the logarithmic amplifier have slightly shorter durations than the pulses gating the signals into the amplifier. This is done to reduce crosstalk between channels caused by logarithmic amplifier and gate time delays.

DETAILED DESCRIPTION OF THE INVENTION

Figure 1:
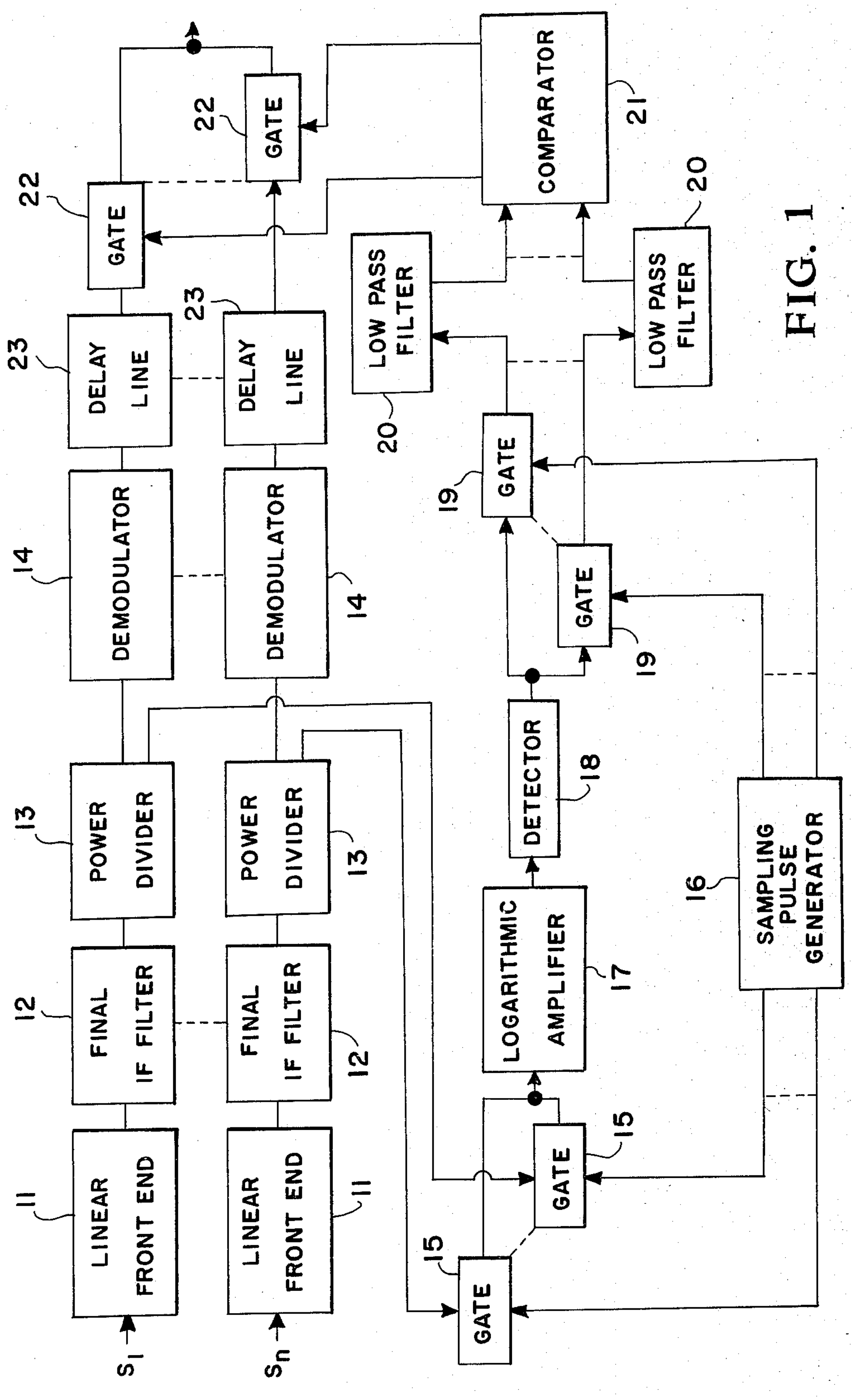
FIG. 1 is a block diagram of the invention.

Turning now to the embodiment of the invention selected for illustration in the drawings, the letter S designates the input signal to the receiver. $S_1$ is the input signal to channel 1 of the receiver, $S_2$ is the input signal to channel 2 (not shown) and $S_n$ is the input signal to channel n. It is to be understood that even though only two channels are shown in the drawing any number of channels greater than one can be used without departing from this invention. The input to each channel is passed through a linear front end 11 and then filtered by a final IF filter 12. Thereafter the signal is divided into two signals by means of a power divider 13 with one signal being applied to a demodulator 14 and with the other signal being applied to a gate 15. Gates 15 are sequentially closed by pulses from a sampling pulse generator 16 thereby sequentially applying the signals in the different channels to a logarithmic amplifier 17, which compresses the signals in the different channels by a factor on the order of a hundred to one. The signals at the output of amplifier 17 are envelope detected by means of a detector 18 and then applied to gates 19. Gates 19 are sequentially closed by pulses from sampling pulse generator 16. The leading edges of the pulses applied to gates 19 occur shortly after the leading edges of the pulses applied gates 15, and the trailing edges of the pulses applied to gates 19 occur shortly before the trailing edges of the pulses applied to gates 15. Consequently, crosstalk between the channels caused by time delays in logarithmic amplifier 17 and gates 19 is reduced. The signal passed through each gate 19 is applied to a low-pass filter 20 which passes only the low-pass, or zeroth order, zone. The resulting signal is the logarithm of the input signal envelope in that channel. The signals at the outputs of low-pass filters 20 are compared by means of a comparator 21 which produces a signal that closes a gate 22 in the channel whose corresponding low-pass filter 20 produces the largest signal. Delay lines 23 are provided to compensate for the time delays of gates 15, logarithmic amplifier 17, detector 18, gates 19, and low-pass filters 20, and insure that the video signals at the input to gates 22 are time-coincident with the actuating signals from comparator 21.

Figure 2:
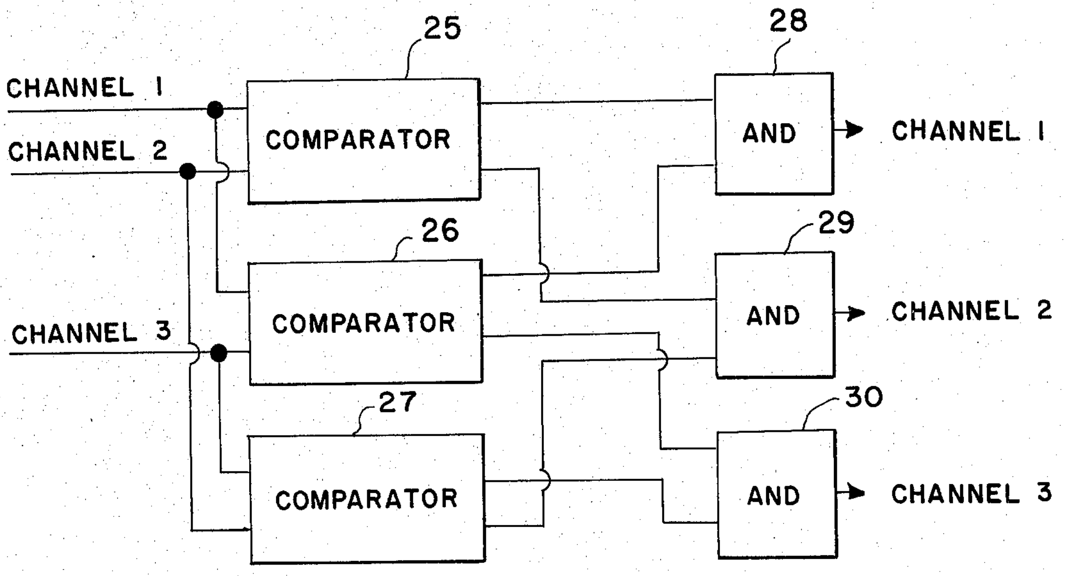
FIG. 2 is a block diagram of a comparator suitable for use as the comparator shown in FIG. 1 when the receiving system is a three-channel system.

If only two channels are used then comparator 21 is a simple comparator that compares two signals and produces a gating signal on its output that corresponds to the input on which the larger of the two signals appears. If more than two channels are used then a combination of simple comparators and AND gates can be used to close the gate 14 corresponding to the low-pass filter 20 producing the largest signal. A comparator 21 suitable for use with a three-channel system is shown in FIG. 2. Three simple comparators 25, 26, and three AND gates 28, 29 and 30 are required. Each channel is compared separately with the other two channels by means of the comparators; and the two channel 1 outputs are connected to AND gate 28, the two channel 2 outputs are connected to AND gate 29 and the two channel 3 outputs are connected to AND gate 30. Consequently, only the AND gate corresponding to the channel having the largest signal will produce a control signal that will close the corresponding gate 14. For $n$ channels comparator 21 requires $n$ AND gates and $(n-1) + \ldots +1$ simple comparators.

Figure 3:
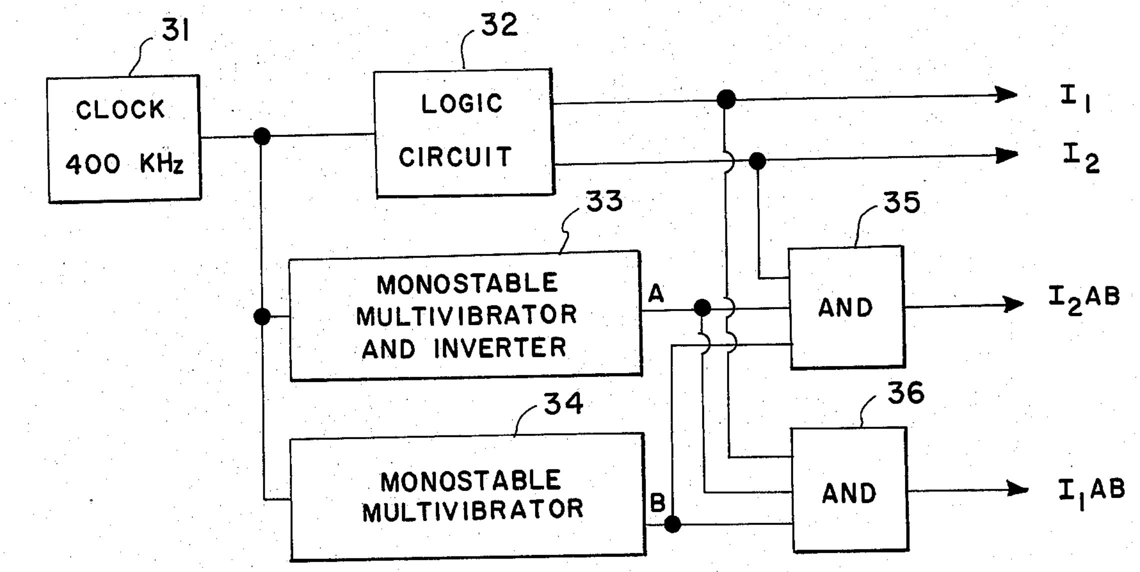
FIG. 3 is a block diagram of the sampling pulse generator shown in FIG. 1.
Figure 4:
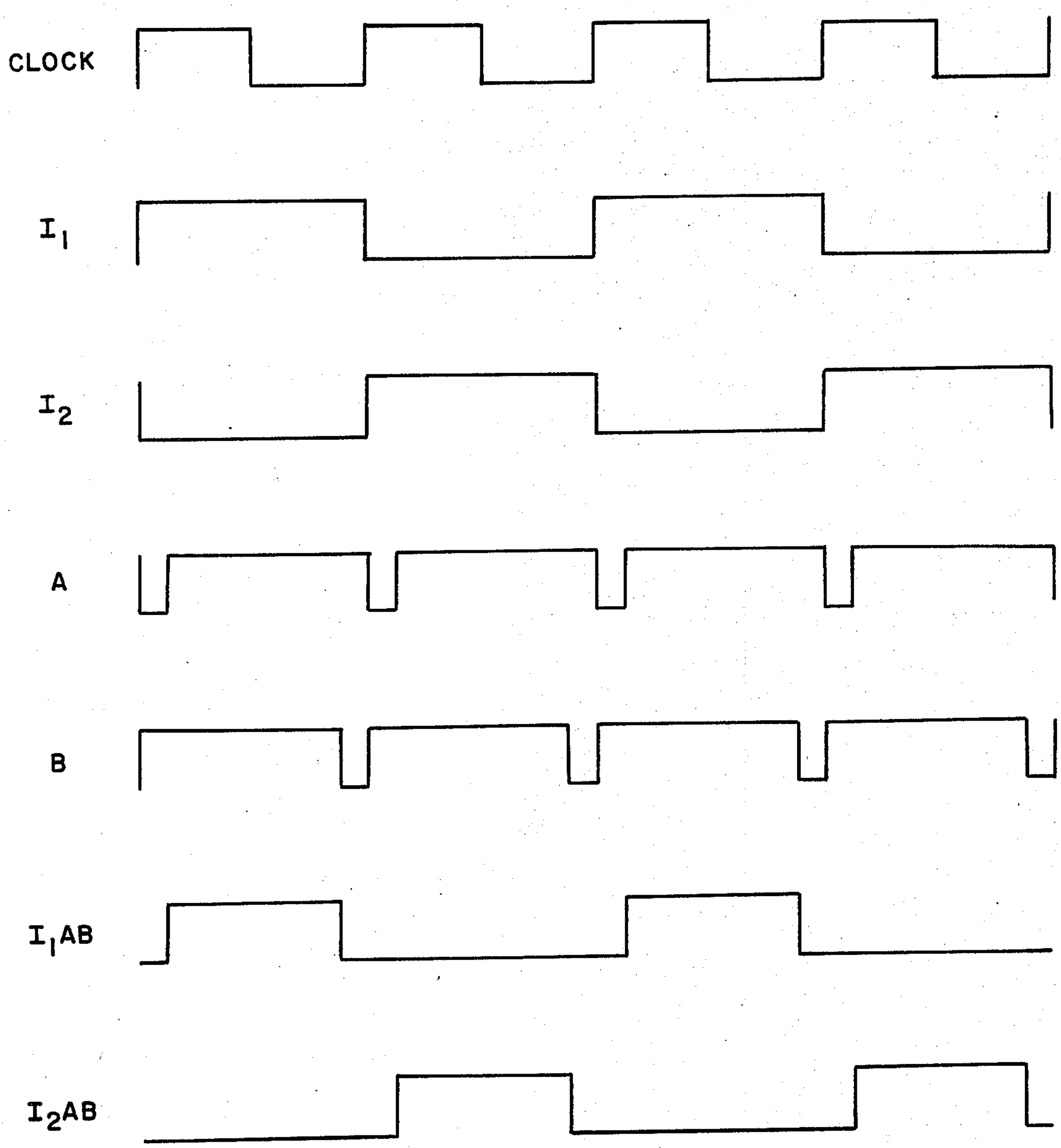
FIG. 4 is a timing diagram for the purpose of describing the operation of the sampling pulse generator.

A sampling pulse generator 16 suitable for use with a two channel receiving system is disclosed in FIG. 3. A clock generator 31 generates the clock pulses shown in FIG. 4. These pulses are applied to a logic circuit 32 which produces the two voltage wave forms $I_1$ and $I_2$. For a two-channel system, logic circuit 32 can be a complementing flip-flop. That is, logic circuit 32 can be a flip-flop with its two inputs connected together and with the clock pulses applied to the inputs of the flip-flop. The clock pulses are also applied to a monostable multivibrator and inverter 33 and to a monostable multivibrator 34. Monostable multivibrator and inverter 33 produces positive voltage levels A that begin shortly after the beginning of each cycle of the clock pulses and ends when the cycle ends, and monostable multivibrator 34 produces positive voltage levels B that begin at the beginning of the clock pulses cycles and end shortly before the end of the cycles. The voltage wave forms $I_2$, A and B are applied to an AND gate 35 to produce the wave form $I_2$ AB, and the voltage wave forms $I_1$, A and B are applied to an AND gate 36 to produce the wave form $I_1$ AB. In FIG. 1, the $I_1$ and $I_2$ wave forms are applied to gates 15 and the $I_1$ AB and $I_2$ AB wave forms are applied to gates 19. Consequently, each gate 15 is closed shortly before and is opened shortly after the corresponding gate 19.

For an $n$-channel receiving system, it is necessary that sampling pulse generator 16 generate the wave forms $I_1, I_2 \ldots I_n$. Where $I_i$ is a wave form that is positive only during the $i$th cycle of the clock pulses. Each of these wave forms $I_i$ is applied along with the wave forms A and B to a corresponding AND gate to produce a wave form $I_i$AB. Hence, $I_i$AB begins shortly after and ends shortly before $I_i$. Logic circuit 32 for generating $I_1, I_2 \ldots I_n$ is a group of flip-flops and AND gates that can be combined by anyone skilled in the logic circuit art to generate the wave form desired.

In the operation of this invention the signals $S_1, S_2 \ldots S_n$ are processed in the $n$-channels of the receiver and applied to the corresponding gates 15. Sampling pulse generator 16 generates wave forms $I_1, I_2 \ldots I_n$ that are applied to the corresponding gates 15 to sequentially gate the signals $S_1, S_2 \ldots S_n$ to logarithmic amplifier 17 and detector 18. Sampling pulse generator 16 also generates wave forms $I_1$ AB, $I_2$ AB . . . $I_n$ AB that are applied to the corresponding gates 19 to sequentially gate the signals $S_1, S_2 \ldots S_n$ out of detector 18 into the correspoinding low-pass filters 20. The outputs of low-pass filters 20 are compared by comparator 21 which generates a signal that closes the gate 22 corresponding to the largest signal thereby allowing only the largest of the signals $S_1, S_2 \ldots S_n$ to be selected at the video output.

This invention has been used in a four channel (frequency and polarization) postdetection switching diversity system. It operated at a 10mHz IF over a 70 dB dynamic range. The isolation between channels was greater than 40 dB, being limited primarily by the "off" isolation of the input (IF) gates. Over the full dynamic range, the maximum analog error was less than $\pm$ 0.5 dB; that is for equal (IF) input signals in all channels, no differential d.c. output exceeded that due to a $\pm$ 0.5 dB input level differential.

This invention is applicable to any situation in which it is required to measure, with low differential error, the amplitudes of a number of RF signals. The level detector can be built to operate at least to 150 mHz with commercially available components (logarithmic amplifier, gates).

The advantages of this invention are: It practically eliminates differential measuring errors since the logarithmic amplifier and detector are common to all channels. It reduces crosstalk between channels since the output gating pulses are slightly shorter than the input gating pulses. It requires only one-point gain adjustments to match the channel detection characteristics. And its low-pass filter responses are subject only to the variations normally encountered in passive LC filters. These variations are independent of the input signals whose amplitudes are to be measured.

What is claimed is:

1. In an $n$-channels RF system, a level detector comprising:

means for effecting a nonlinear transformation of an RF signal;

detector means connected to the output of said means for effecting a nonlinear transformation of an RF signal for envelope detecting the RF signal;

$n$ normally open first gates in one-to-one correspondence with said $n$-channels with each of said first gates connecting its corresponding channel to the input of said nonlinear transformation means;

$n$ low-pass filters in one-to-one correspondence with said $n$-channels;

$n$ normally open second gates in one-to-one correspondence with said $n$-channels with each of said second gates connected to the output of said detector means and to the input of its corresponding low-pass filter; and means for reducing the crosstalk between channels by sequentially closing said first gates and for sequentially closing said second gates such that each second gate closes a short interval of time after and opens a short interval of time before its corresponding first gate.

2. A level detector according to claim 1 wherein said means for sequentially closing said first gates and for sequentially closing said second gates is a sampling pulse generator means for sequentially applying gating pulses to said first gates and for sequentially applying gating pulses to said second gates with each gating pulse applied to a second gate beginning after and terminating before the pulse applied to the corresponding first gate.

3. A level detector according to claim 2 wherein said sampling pulse generator means has n parallel outputs connected to corresponding ones of said first gates and n parallel outputs connected to corresponding ones of said second gates.

* * * * *